(12) United States Patent
Stenersen

(10) Patent No.: US 6,951,697 B2
(45) Date of Patent: Oct. 4, 2005

(54) INTEGRATED SYSTEMS FOR USE WITH FUEL CELLS, AND METHODS

(75) Inventor: Eivind Stenersen, River Falls, WI (US)

(73) Assignee: Donaldson Company, Inc., Bloomington, MN (US)

( * ) Notice: Subject to any disclaimer, the term of this patent is extended or adjusted under 35 U.S.C. 154(b) by 432 days.

(21) Appl. No.: 10/241,117

(22) Filed: Sep. 10, 2002

(65) Prior Publication Data

US 2003/0064271 A1 Apr. 3, 2003

Related U.S. Application Data

(60) Provisional application No. 60/322,106, filed on Sep. 11, 2001.

(51) Int. Cl.[7] ............................................... H01M 8/00
(52) U.S. Cl. ...................................................... 429/12
(58) Field of Search ............................. 429/34, 22, 24, 429/13, 28, 12, 26

(56) References Cited

U.S. PATENT DOCUMENTS

| | | |
|---|---|---|
| 3,847,672 A | 11/1974 | Trocciola et al. .......... 136/86 C |
| 4,080,791 A | 3/1978 | Nadler et al. .................. 60/670 |
| 4,595,642 A | 6/1986 | Nakanishi et al. ............. 429/19 |
| 4,737,173 A | 4/1988 | Kudirka et al. ................ 55/276 |

(Continued)

FOREIGN PATENT DOCUMENTS

| | | |
|---|---|---|
| EP | 677417 | 10/1995 |
| EP | 0837238 | 4/1998 |
| EP | 1 158 590 A2 | 4/2001 |
| EP | 1 162 354 A2 | 4/2001 |
| EP | 1158590 | 11/2001 |
| EP | 1162354 | 12/2001 |
| EP | 1195830 | 4/2002 |
| GB | 2250130 | 5/1992 |
| JP | 9-26177 | 1/1997 |
| WO | WO 01/48850 | 7/2001 |
| WO | WO 02/27835 | 4/2002 |
| WO | WO 02/084099 | 10/2002 |

OTHER PUBLICATIONS

Moore J. et al., "The effects of battlefield contaminants on PEMFC performance" *Journal of Power Sources*, vol. 85, pp. 254–260 (2000).

Sakamoto, S et al., "Study of the Factors Affecting PEFC Life Characteristic", *Ecology and Energy Systems Research Center*, SANYO *Electric Co., Ltd.*, Tochigi 326–8534, Japan, pp. 141–144 date unknown.

Füsser et al., Air Filter and Exhaust Systems in Fuel Cell Engines, SAE Technical Paper Series, 2000–01–0381, Mar. 6–9, 2000.

*Primary Examiner*—Patrick Joseph Ryan
*Assistant Examiner*—Thomas H. Parsons
(74) *Attorney, Agent, or Firm*—Merchant & Gould P.C.

(57) ABSTRACT

Integrated systems, including components for control of contaminants, sound, and humidity, are provided for a fuel cell system. The integrated system combines contamination control, sound control, and water management. The contamination control system provides filtration for the intake air that provides oxygen to the fuel cell cathode, materials removed can include sub-micrometer particulate matter, salts oils, and chemicals. The sound control system reduces the level of noise emitted from the system by attenuating, resonating, or muffling the sound emitting from the air compressor used to move the air. The contamination control system can also provide security downstream of the compressor, by filtering the air to reduce the opportunity of lubricant from reaching the fuel cell. The water management system removes liquid water when excess is present. These systems are integrated in a variety of configurations to provide compact and thorough protection for the fuel cell.

15 Claims, 10 Drawing Sheets

U.S. PATENT DOCUMENTS

| | | |
|---|---|---|
| 5,013,617 A | 5/1991 | Scheffler .................... 429/17 |
| 5,156,925 A | 10/1992 | Lapp .......................... 429/19 |
| 5,189,092 A | 2/1993 | Koslow ...................... 524/495 |
| 5,221,586 A | 6/1993 | Morimoto et al. ............ 429/20 |
| 5,331,037 A | 7/1994 | Koslow ...................... 524/496 |
| 5,366,821 A | 11/1994 | Merritt et al. ................ 429/21 |
| 5,372,617 A | 12/1994 | Kerrebrock et al. ........... 48/61 |
| 5,401,589 A | 3/1995 | Palmer et al. ................ 429/13 |
| 5,458,095 A | 10/1995 | Post et al. ..................... 123/3 |
| 5,626,820 A | 5/1997 | Kinkead et al. ............ 422/122 |
| 5,641,031 A | 6/1997 | Riemer et al. ............. 180/65.3 |
| 5,646,852 A | 7/1997 | Lorenz et al. ........ 364/431.051 |
| 5,662,184 A | 9/1997 | Riemer et al. ............. 180/65.1 |
| 5,792,247 A | 8/1998 | Gillingham et al. .......... 96/386 |
| 5,794,732 A | 8/1998 | Lorenz et al. ............. 180/65.3 |
| 5,837,393 A | 11/1998 | Okamoto ...................... 429/20 |
| 5,944,878 A | 8/1999 | Lindhe ......................... 96/132 |
| 5,981,096 A | 11/1999 | Hornburg et al. ............. 429/17 |
| 6,007,930 A | 12/1999 | Adams et al. ................. 429/13 |
| 6,013,385 A | 1/2000 | DuBose ........................ 429/17 |
| 6,057,051 A | 5/2000 | Uchida et al. ................. 429/19 |
| 6,074,769 A | 6/2000 | Johnssen ........................ 429/2 |
| 6,124,052 A | 9/2000 | Katoh et al. ................... 429/33 |
| 6,152,996 A | 11/2000 | Linnersten et al. ............ 96/135 |
| 6,190,432 B1 | 2/2001 | Gieseke et al. ............. 55/385.3 |
| 6,284,397 B1 | 9/2001 | Barton ......................... 429/17 |
| 6,296,957 B1 | 10/2001 | Graage ........................ 429/12 |
| 6,309,769 B1 | 10/2001 | Haug ........................... 429/13 |
| 6,316,134 B1 | 11/2001 | Cownden et al. ............. 429/19 |
| 6,420,059 B1 | 7/2002 | Surampudi et al. ........... 429/13 |
| 6,432,177 B1 | 8/2002 | Dallas et al. ................. 96/132 |
| 6,436,562 B1 | 8/2002 | DuBose ....................... 429/13 |
| 6,780,534 B2 | 8/2004 | Stenersen et al. |
| 6,783,881 B2 | 8/2004 | Stenersen et al. ............. 429/34 |
| 6,783,882 B2 | 8/2004 | Schmidt ....................... 429/34 |
| 6,797,027 B2 | 9/2004 | Stenersen et al. .......... 55/350.1 |
| 2001/0049036 A1 | 12/2001 | Raiser ......................... 429/13 |

INTEGRATED SYSTEMS FOR USE WITH FUEL CELLS, AND METHODS

Priority under 35 U.S.C. §119(e) is claimed to provisional application Ser. No. 60/322,106, filed on Sep. 11, 2001, and entitled "Reliability and Sound Suppression Improvement for Fuel Cells Through the Development of a New Class of Fail-Safe Systems". The complete disclosure of application 60/322,106 is incorporated by reference herein.

FIELD OF THE DISCLOSURE

The present disclosure is related to integrated systems for use with fuel cells, the integrated system including components for control of contaminants, sound, humidity, and the like. In particular, the disclosure is directed to various systems that combine filter assemblies that remove contaminants from the intake air going into fuel cells with Sound suppression, and to systems that modify the exhaust coming out from fuel cells.

BACKGROUND

Fuel cell systems, although a probable, highly used power source for the future, have many issues associated with them. Fuel cell systems, which include the fuel cell (or fuel cell stack), a source of oxygen, a source of fuel, and the appropriate equipment needed to obtain sufficient, and preferably optimal, operation the fuel cell, include many parameters that are not completely understood. That is, it is not well understood what is the best configuration for fuel cell systems.

The life, durability and performance of the fuel cells can be greatly affected by the quality of air used as the oxygen source for the cathode side of the fuel cell. Many types of contaminants present in atmospheric or ambient air can be detrimental to the operation of the fuel cell. The cathode catalyst and the electrolyte can be temporarily or permanently poisoned or damaged by any number of various contaminants, such as sub-micrometer particulate matter, sulfur compounds, VOCs, salts and $NH_x$ etc. The concentration and type of these atmospheric contaminants vary with location, time of day and with season. Generally, the removal of these contaminants is beyond the capability of current air contamination control systems (e.g., particulate filters) used in power plants such as internal combustion engines and gas turbines. Therefore, to maximize the performance, life and durability of fuel cells, the fuel cell system should include at least some form of contaminant control.

The catalytic reaction occurring within the fuel cell is a silent process, in that the hydrogen fuel, the reaction at the cathode, and the production of power, produce no sound audible by humans. However, although the fuel cell is silent, fuel cell systems generally utilize compressors/expanders, blowers or other air moving equipment to either move air through the fuel cell cathode at just above atmospheric pressure, or to pressurize the cathode air. In either case, the air moving equipment emits objectionable noise at significant sound pressure levels. Additionally, some types of compressors have been known to leak lubricant oil, which can damage a fuel cell.

The humidity in the oxygen entering the fuel cell can also affect the performance of the fuel cell. Particulate contaminants in the air stream can cause vapor water to condense, as can compression of the air. To maximize the fuel cell performance, the water and/or moisture level throughout the fuel cell system should be controlled.

As generally described above, proper performance of a fuel cell system has many issues associated therewith. In many instances, the numerous pieces of equipment present in the system form a tangled mess of housings, pipes, and fittings. Improvements are desired.

SUMMARY

The present disclosure provides integrated systems for use with fuel cells, the integrated system including components for control of contaminants, sound, temperature, and humidity in the fuel cell system. In particular, the disclosure is directed to various assemblies that combine contamination control, sound control, and water management.

The contamination control system provides filtration for the intake air that provides oxygen to the fuel cell cathode; materials removed can include sub-micrometer particulate matter, salts, oils, and chemicals. The sound control system provides broadband attenuation of the sound present in the fuel cell system. The sound control system, which can include a resonator, sonic choke, full choke, sound adsorbent material, etc., attenuates or otherwise reduces sound passing through the system by at least 3 dB at one meter, preferably by at least 6 dB. The contamination control system can also provide security downstream of the compressor, by filtering the air to reduce the opportunity of lubricant from reaching the fuel cell. The temperature control system controls the temperature of the system, by adding or removing heat, as desired. The water management system removes liquid water when excess is present. These systems are integrated in a variety of configurations to provide compact and thorough protection for the fuel cell.

In one particular configuration, the various systems are arranged as an upstream integrated assembly, an attenuated heat exchanger assembly, a downstream integrated assembly, and an exhaust assembly.

Also, the effects of cathode air contaminants on the performance of PEM fuel cells were compiled. Contaminants which affect fuel cell performance and reliability, along with technology in high efficiency filtration of particulate matter, oils, salts and chemicals, and acoustics were incorporated in the development of the various assemblies.

In particular, the present disclosure is directed to a fuel cell system that has multiple integrated assemblies. The system comprises a fuel cell having an inlet for an air stream, and air moving equipment having an inlet and an outlet for the air stream, the outlet operably connected to the fuel cell inlet. A first integrated assembly is positioned in the air stream upstream from the air moving equipment, and a second integrated assembly is positioned in the air stream downstream from the air moving equipment, the first and second integrated assemblies including at least two systems of a contamination control system, a sound control system, a temperature control system, and a water management system. In one embodiment, the first integrated assembly includes a contamination control system and a sound control system. The contamination control system can include a particulate filter and a chemical filter. A third integrated assembly can also be present in the fuel cell system.

The present disclosure is also directed to an integrated assembly for use with a fuel cell system, the system comprising sound-producing air moving equipment. The assembly comprises a housing having an air inlet and an air outlet, a sound control system constructed to reduce sound by at least 3 dB, and a temperature control system, each of the sound control system and the temperature control system being within the housing. The temperature control system can be a heat exchanger.

BRIEF DESCRIPTION OF THE DRAWINGS

FIG. 2 illustrates an upstream integrated assembly, a downstream integrated assembly, and an exhaust assembly.

FIG. 3 illustrates an attenuated heat exchanger assembly.

DETAILED DESCRIPTION

Figure 1:
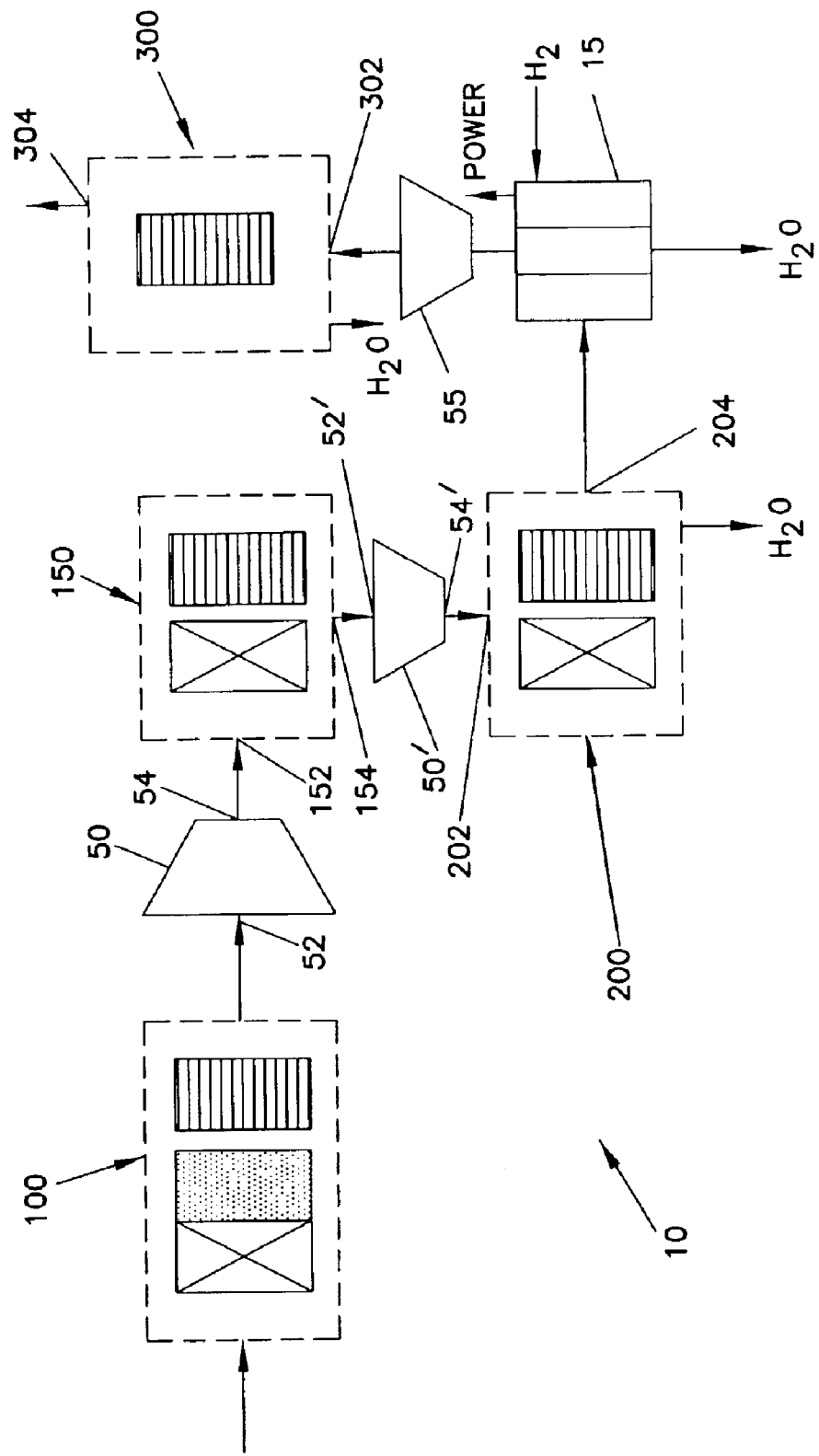
FIG. 1 is a schematic diagram of an integrated fuel cell system in according with the present disclosure.

Referring to the figures, wherein like numerals represent like parts throughout the several views, there is schematically illustrated in FIG. 1, a fuel cell system 10. Fuel cell system 10 includes a fuel cell 15, a first compressor 50 and a second compressor 50' upstream in the air flow to fuel cell 15, and an expander 55 downstream of fuel cell 15 in the air flow.

Although compressors 50, 50' and expander 55 are shown, it is understood that any type of suitable air moving equipment, such as compressors, expanders, turbochargers, blowers or other air moving equipment can be used to move air to fuel cell 15. As mentioned above, generally all air moving equipment emits some level of objectionable noise.

Fuel cell system 10 includes an upstream integrated assembly 100, an attenuated heat exchanger assembly 150, a downstream integrated assembly 200, and an exhaust assembly 300. By use of the terms "upstream" and "downstream", reference is to the air moving equipment upstream of fuel cell 15, such as compressor 50. By use of the term "integrated", what is meant is having multiple systems, such as a contamination control system, sound control system, temperature control system, or water management system, in one assembly; preferably, the assembly is contained in a single housing, although in some embodiments, two or more housings are joined to form a single housing. As stated above, the air moving equipment can be a compressor, expander, turbocharger, blower, or any such item.

Figure 2:
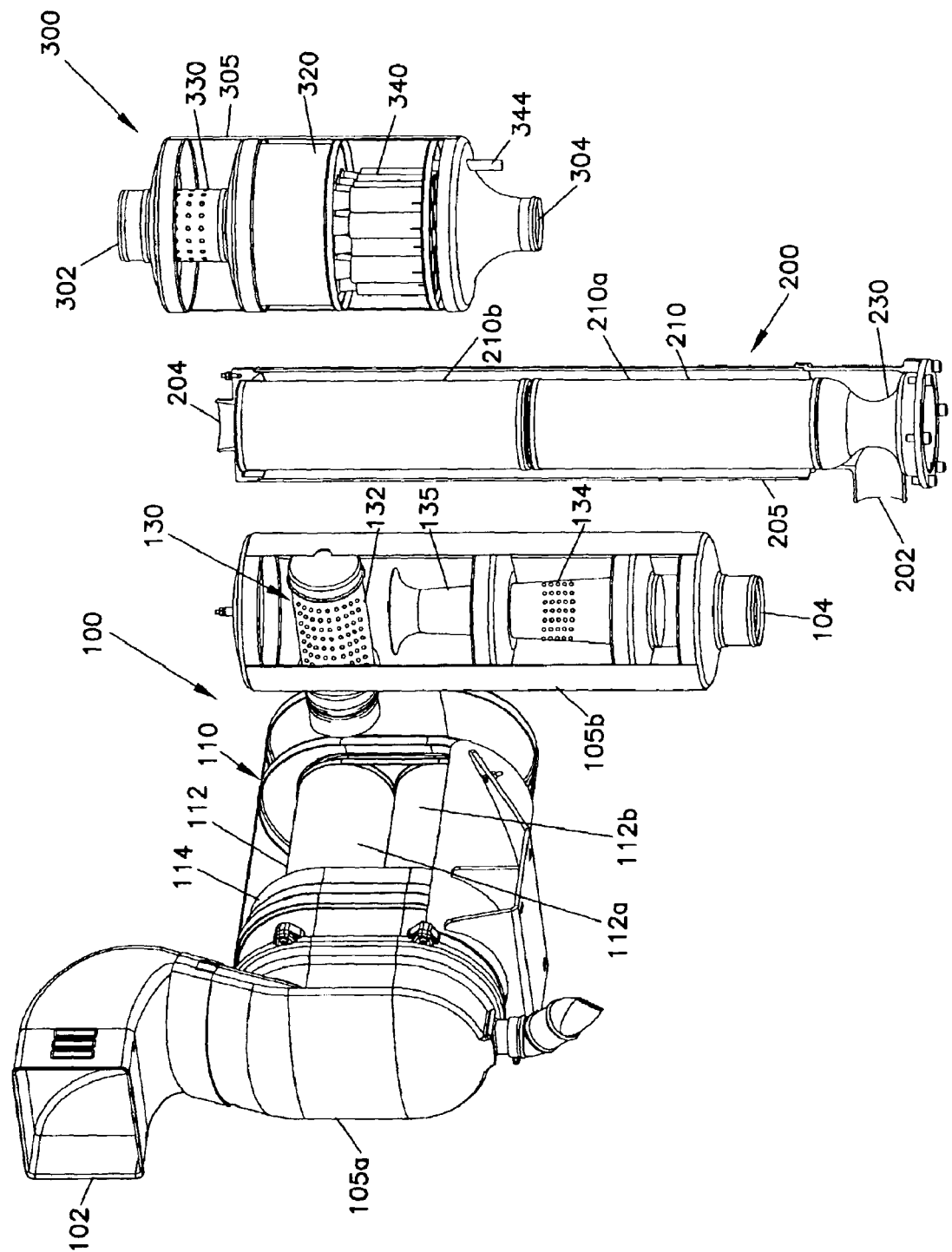
FIG. 2 is a partial, cross sectional, detailed view of various portions of the integrated fuel cell system of FIG. 1; specifically.

Upstream integrated assembly 100, illustrated schematically in FIG. 1, can include a particulate filter, a chemical removal filter, which is typically a carbon-based material, and a sound suppression element. Such upstream filter assemblies 100 are discussed, for example, in U.S. Pat. Nos. 6,780,534 and 6,783,881, the entire disclosures of which are incorporated herein by reference. Typically, each of the parts of upstream integrated assembly 100 (i.e., the particulate filter, chemical filter, and sound suppression) is housed within the same housing, but, in some embodiments, any one or more of these parts may be present in a separate housing or unit. Referring to FIG. 2, one preferred upstream integrated assembly 100 is illustrated in detail.

In FIG. 2, upstream integrated assembly 100 comprises two portions arranged in series, a first portion in a housing 105a having a contamination control system and a sound control system, and a second portion in housing 105b having a sound control system. Assembly 100 has an inlet 102 and an outlet 104. Inlet 102 feeds air, typically atmospheric or ambient air, into housing 105a. The air passes through a contaminant control or filtration system 110 that includes a particulate or physical contamination removal system and a chemical contamination removal system. In the embodiment illustrated, filtration system 110 has a chemical filter element 112, which includes a first filter element 112a and a second filter element 112b, and a particulate filter element 114.

Chemical filter element 112 removes contaminants from the air by either adsorption or absorption. As used herein, the terms "adsorb", "adsorption", "adsorbent" and the like, are intended to also include the mechanisms of absorption and adsorption.

The chemical contamination removal system typically includes a physisorbent or chemisorbent material, such as, for example, desiccants (i.e., materials that adsorb or absorb water or water vapor) or materials that adsorb or absorb volatile organic compounds and/or acid gases and/or basic gases. The terms "adsorbent material," "adsorption material," "adsorptive material," "absorbent material," absorption material, "absorptive material," and any variations thereof, are intended to cover any material that removes chemical contaminants by adsorption or absorption. Suitable adsorbent materials include, for example, activated carbon, including carbon fibers, impregnated carbon, activated alumina, molecular sieves, ion-exchange resins, ion-exchange fibers, silica gel, and silica. Any of these materials can be combined with, coated with, or impregnated with materials such as, for example, potassium permanganate, calcium carbonate, potassium carbonate, sodium carbonate, calcium sulfate, citric acid, phosphoric acid, other acidic materials, or mixtures thereof. In some embodiments, the adsorbent material can be combined or impregnated with a second material.

The adsorbent material typically includes particulates or granulated material and can be present in varied configurations, for example, as granules, beads, fibers, fine powders, nanostructures, nanotubes, aerogels, or can be present as a coating on a base material such as a ceramic bead, monolithic structures, paper media, or metallic surface. The adsorbent materials, especially particulate or granulated materials, can be provided as a bed of material. Alternately, the adsorbent material can be shaped into a monolithic or unitary form, such as, for example, a large tablet, granule, bead, or pleatable or honeycomb structure that optionally can be further shaped. In at least some instances, the shaped adsorbent material substantially retains its shape during the normal or expected lifetime of the filter assembly. The shaped adsorbent material can be formed from a free-flowing particulate material combined with a solid or liquid binder that is then shaped into a non-free-flowing article. The shaped adsorbent material can be formed by, for example, a molding, a compression molding, or an extrusion process.

Shaped adsorbent articles are taught, for example, in U.S. Pat. No. 5,189,092 (Koslow), and U.S. Pat. No. 5,331,037 (Koslow), which are incorporated herein by reference.

In the embodiment illustrated in FIG. 2, filter elements 112a, 112b are hollow, cylindrical forms of extruded activated carbon.

Particulate filter 114 removes physical or particulate contaminants, contaminants such as dust, dirt, smog, smoke, diesel particulate, pollen, insects, wood chips and sawdust, metal shavings, cosmic dust, and the like. Typically, the particulate removal portion contains a filter media, such as a fibrous mat or web, including cellulosic materials, to remove particles. The media used in filter element 114 can vary, depending on the particulate removal efficiency desired, the maximum level of acceptable pressure drop through filter 114, and other such factors. The filter media can be treated in any number of ways to improve its efficiency in removing minute particulates; for example, electrostatically treated media can be used, as can cellulose or synthetic media or a combination thereof, having one or more layers of nanofiber, or other types of media known to those skilled in the art. For details regarding types of nanofiber that could be used, see for example, U.S. Pat. No. 4,650,506 (Barris et al.), which is incorporated herein by reference.

In the preferred embodiment, particulate filter element 114 includes a cellulosic filter media that is wound about a central axis to form an obround shaped filter element. The filter element includes a sealing system for sealing filter 114 to housing 105a, a sealing system such as disclosed, for example, in U.S. Pat. No. 4,720,292. By the term "seal" or "sealing," it is meant that sealing system 60, under normal conditions, prevents unintended levels of air from passing through a region between the outer surface of filter element 114 and the interior sidewall of housing 105a; that is, the sealing system inhibits air flow from avoiding passage through filtering media of filter element 114.

In certain preferred arrangements, filter 114 is configured for straight-through flow. By "straight-through flow," it is meant that filter 114 is configured so as to have a first flow face (corresponding to an inlet end) and an opposite, second flow face (corresponding to an outlet end). Straight-through flow is often desired because a straight-through flow filter can handle greater amounts of air passing therethrough compared to, for example, a pleated filter. It is intended that there is no distinction between "straight-though flow" and "in-line flow". Air enters in one direction through the first flow face and exits in the same direction from second flow face.

Additional and alternate details regarding chemical filter 112 and particulate filter 114 are described in U.S. Pat. Nos. 6,780,534 and 6,783,881.

From this contaminant control system (i.e., filters 112, 114), the air progresses to a sound control system within upstream integrated assembly 100. Specifically, the air progresses into housing 105b where a sound suppression configuration 130 is housed. Sound suppression configuration 130 includes a first resonator 132 and a second resonator 134. Each of these resonators 132, 134 includes a plurality of perforations, their size and placement exactly engineered in order to resonate desired wavelengths of sound. Sound suppression configuration 130 also includes a sonic choke 135.

Sound suppression configuration 130 reduces or suppresses the level of noise or sound emanating from any of compressor 50, compressor 50', and expander 55. Such noise reduction is preferably at least 3 dB at one meter, typically at least 6 dB, preferably at least 10 dB, and most preferably at least 25 dB. Sound suppression configuration 130 reduces the noise emanating from compressor 50 through upstream integrated assembly 100 and out to the surrounding environment, by attenuating the sound.

Sound emanating from equipment such as compressor 50 will travel in any direction as permitted by fuel cell 15, compressor 50, and other assemblies such as upstream integrated assembly 100, attenuated heat exchanger assembly 150, downstream assembly 200 and exhaust assembly 300. That is, sound travels upstream from compressor 50, against the flow of the air, to upstream integrated assembly 100; and sound travels downstream to attenuated heat exchanger assembly 150. Sound from compressor 50' and expander 55 likewise travels upstream and downstream.

Sound suppression configuration 130 can include any type of element that, together with other features of upstream integrated assembly 100 that may attenuate or otherwise reduce the sound by at least 3 dB, typically at least 6 dB, preferably by at least 10 dB, and more preferably by at least 25 dB. Examples of suitable sound suppression elements include mufflers, lined ducts, baffles, bends in the sound path, plenums, expansion chambers, resonators, sonic chokes, full chokes, sound adsorptive material, and various combinations thereof. As indicated above, the embodiment illustrated in FIG. 2 has sound suppression configuration 130 having first resonator 132, second resonator 134 and sonic choke 135.

Sound suppression configuration 130 is provided in housing 105b. It is preferred that the outer wall of housing 105b and any other structures have minimal surfaces that are planar or flat; rather, it is preferred that the surfaces are curved, to reduce the amount of vibration or drumming that often occurs with flat walls.

Additional and alternate details regarding sound suppression configuration 130, including resonators 132, 134, sonic choke 135, and other attenuating or resonating equipment are described in U.S. Pat. Nos. 6,780,534 and 6,783,881.

The air, having passed through a contamination control system and a sound control system, exits upstream integrated assembly 100 via outlet 104 and progresses to compressor 50. The air enters compressor 50 via inlet 52 and exits via outlet 54. As mentioned above, compressor 50 can be any suitable air moving equipment.

Figure 3:
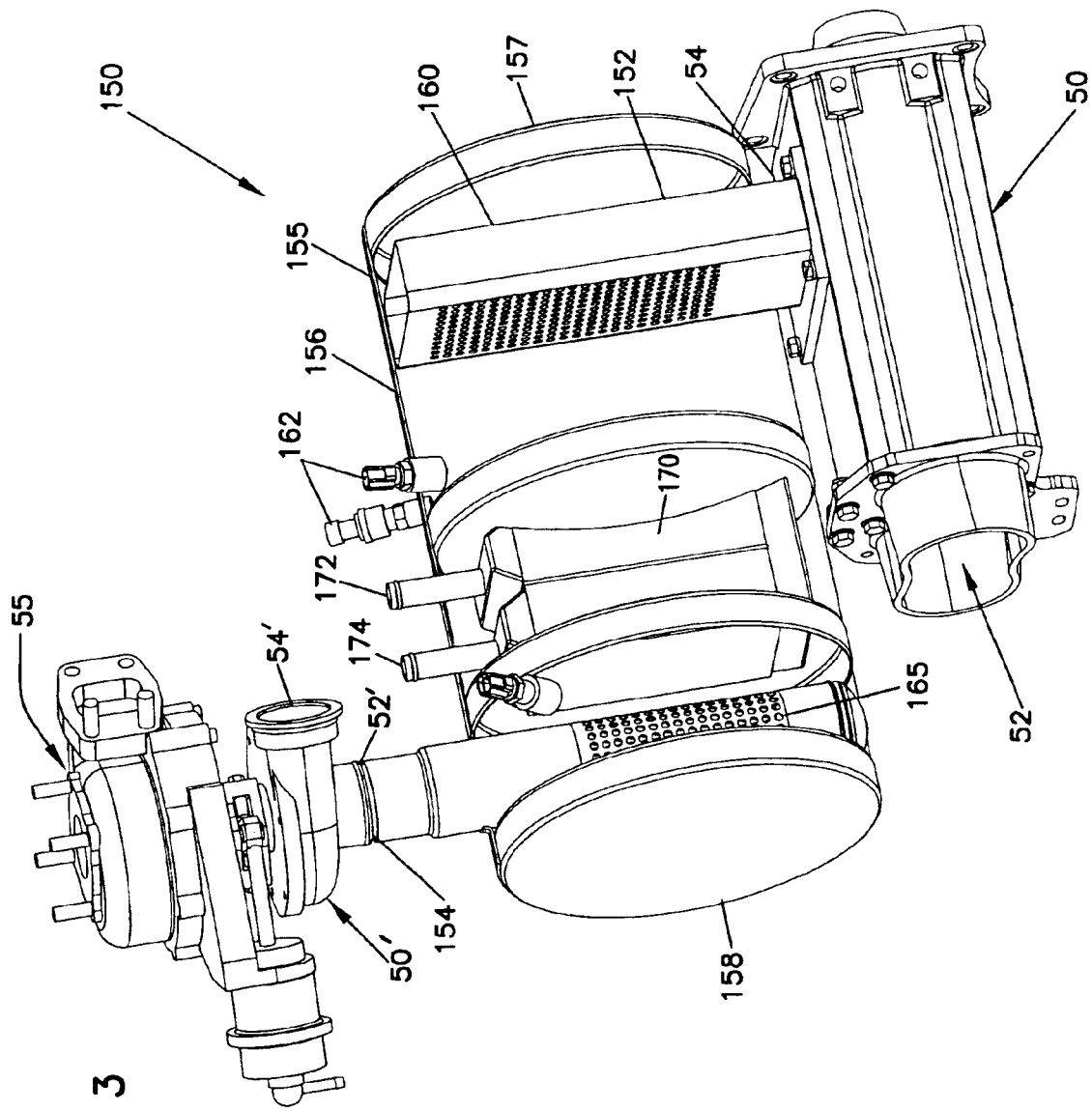
FIG. 3 is an isometric view of another portion of the integrated fuel cell system of FIG. 1; specifically.

From compressor 50, the air moves to attenuated heat exchanger assembly 150. This assembly 150 can also be called an "intercooler assembly", the assembly having a heat exchanger (or cooler) and being positioned between compressor 50 and compressor 50'. If no compressor 50' was present, thus, assembly 150, positioned downstream of compressor 50, could be called an "aftercooler assembly". One preferred embodiment for attenuated heat exchanger assembly 150 is illustrated in FIG. 3.

Attenuated heat exchanger assembly 150 is so named due to its integration of a sound control system and a temperature control system retained in a housing 155. Housing 155 has an inlet 152 and an outlet 154; assembly 150 receives air from outlet 54 of compressor 50 through inlet 152. Inlet 152 connects to a sound suppression element 160, which has a plurality of apertures designed to attenuate sound. Assembly 150 also includes a second sound suppression element 165. Sound suppression elements 160, 165 attenuate or otherwise reduce the sound by at least 3 dB, typically at least 6 dB, preferably by at least 10 dB, and more preferably by at least 25 dB. Housing 155 also reduces the level of sound passing through assembly 150; housing 155 is a cylindrical shape, having a wall 156 extended between rounded first end 157 and rounded second end 158. The surfaces of wall 156 and ends 157, 158 are curved, to reduce the amount of vibration or drumming.

Positioned between sound suppression elements 160, 165 is a heat exchanger 170. Heat exchanger 170 cools the air passing through assembly 150, by removing heat via cooling water that is fed into heat exchanger 170 via cooling water inlet 172; heated water is removed via cooling water outlet 174. The air entering assembly 150 via inlet 152 is at an elevated temperature, due to the compression by compressor 50.

Figure 4:
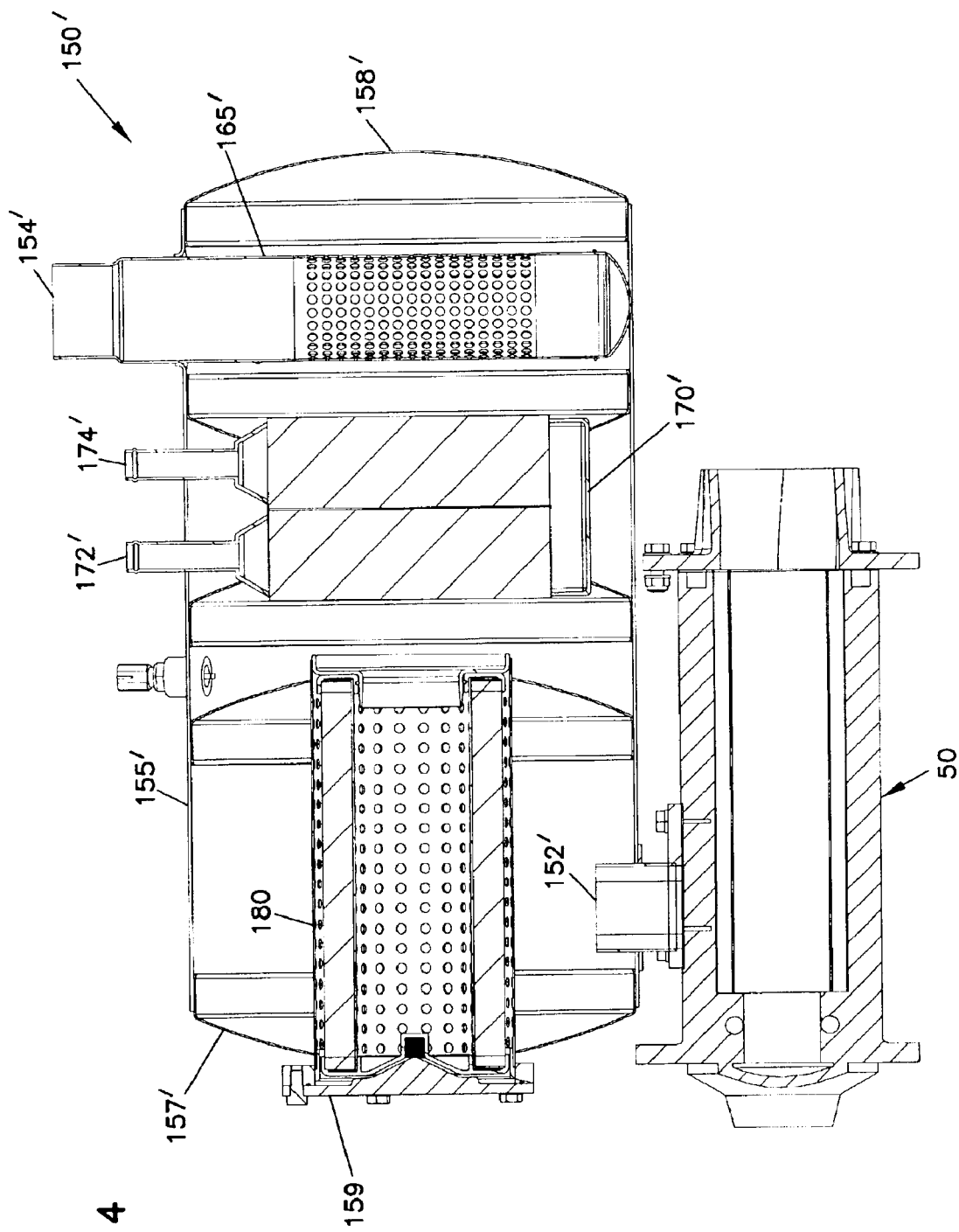
FIG. 4 is a cross-sectional view of a second embodiment of an attenuated heat exchanger assembly.

A second embodiment for an attenuated heat exchanger assembly is illustrated in FIG. 4 at 150'. Attenuated heat exchanger assembly 150' includes a contamination control system.

Similar to assembly 150 of FIG. 3, assembly 150' has a housing 155' having an inlet 152' and an outlet 154'. Housing 155' has a first end 157' and an opposite second end 158'. First end 157' includes a removable flange cover 159, the use of which will be described below. Air from compressor 50 enters assembly 150' via inlet 152' and progresses to a filter element 180. Filter element 180 is a particulate filter element, and preferably comprises PTFE material. Filter element 180 typically includes a perforated inner liner, used to provide stability and structure to the pleated media while permitting air flow therethrough. In some embodiments, it may be preferred to have the perforations designed to attenuate or resonate sound. As mentioned, first end 157' includes flange 159, which provides access to filter element 180, for removal and replacement of filter element 180, as desired.

From filter element 180, the now-filtered air passes to heat exchanger 170' (which has cooling water inlet 172' and outlet 174') where the air is cooled. The cooled air progresses to resonator 165' and then out via outlet 154'.

Air from attenuated heat exchanger assembly 150, 150' having passed through second compressor 50', progresses to downstream integrated assembly 200.

Downstream integrated assembly 200, schematically shown in FIG. 1, can have any of a contamination control system, a sound control system, and a water management system. Examples of downstream filter assemblies 200 are discussed, for example, in U.S. Pat. Nos. 6,780,534 and 6,783,881. Returning again to FIG. 2, one embodiment of a preferred downstream integrated assembly 200, having a sound suppression element and a filter which manages water, is illustrated.

Downstream integrated assembly 200 has an inlet 202, an outlet 204, and a housing 205. Positioned within housing 205 is a filter 210. Filter 210 has two filter elements 210a and 210b. In the shown embodiment, filter element 210a, 210b are made from a material, such as expanded polytetrafluoroethylene (PTFE), which acts as both a particulate and chemical filter. The PTFE inhibits passage of salts and organic materials, such as oil, therethrough. Thus, the PTFE accomplishes both particulate and chemical filtration. PTFE also allows water vapor to pass through, yet coalesces and collects liquid water. This water is generally drained from assembly 200.

Assembly 200 also includes a sound suppression element 230 within housing 205. Sound suppression element 230 attenuates or otherwise reduces the sound, by at least 3 dB, typically at least 6 dB, preferably by at least 10 dB, and more preferably by at least 25 dB. Housing 205, and filter 210, are preferably circular to increase the sound suppression of assembly 200.

The air flow through downstream filter assembly 200 can be monitored to determine if a potentially detrimental contamination may, or may have, occurred. At least three possible options for monitoring are available. An air mass flow sensor can be installed between filter 210 and fuel cell 15 to monitor the mass of air passing through filter 210. As the mass decreases, the level of clogging of filter 210 can be estimated. As a second option, the pressure drop across filter 210 can be monitored. As a third option, a pressure relief valve can be installed upstream of filter 210; thus, if filter 210 becomes too clogged and does not allow sufficient air to flow therethrough, pressure will building up upstream of filter 210, and the pressure relief valve will blow.

Air enters downstream integrated assembly 200 via inlet 202, is attenuated by sound suppression element 230 and then passes through filter 210, either inside out or outside in. Filter 210 removes particulates that may have passed through, or been created by, compressor 50'. Air exits from downstream integrated assembly 200 via outlet 204 and progresses to fuel cell 15.

Fuel cell 15 utilizes oxygen from the inputted air and hydrogen to fuel a catalytic reaction and produce power. Water, either in the form of vapor or liquid, is produced as a by-product. The exhaust air from fuel cell 15 may have collected contamination, for example, from the catalyst on the anode or the electrolyte.

The air entering fuel cell 15 is typically at an elevated pressure, in the system of FIG. 1, having passed through compressor 50 and compressor 50'. This increased pressure improves the efficiency of fuel cell 15. Once through fuel cell 15, the air can be return to atmospheric pressure, or at least reduced from its elevated pressure. In FIG. 1, the air stream passes through expander 55. In one preferred embodiment, expander 55 is together with a compressor stage, compressor 50' in FIG. 3, thus both compressor 50' and expander 55 are incorporated into one turbocharger unit, as illustrated in FIG. 3.

Fuel cell system 10 of FIG. 1 further includes exhaust assembly 300, positioned downstream of fuel cell 15, to which the air progresses from expander 55.

Exhaust assembly 300 is positioned on the exhaust end of fuel cell 15, so that the air passing through assembly 300 has a reduced level of oxygen. Also present in the exhaust air is water, both liquid water and water vapor.

One preferred embodiment of exhaust assembly 300 is illustrated in FIG. 2 having a contamination control system, a sound control system, and a water management system. Specifically, exhaust assembly 300 has a sound suppression element 330, a chemical filter 320, and a water removal element 340 all present within housing 305. Water removal element 340 removes the liquid water, but allows the water vapor to pass out with the air stream.

Housing 305 has an inlet 302 for receiving air from fuel cell 15, and an outlet 304 for exiting air. Air enters exhaust assembly 300 via inlet 302 and progress to sound suppression element 330. A chemical filter 320 is positioned downstream of element 330. Liquid water is removed from the air stream by water removal element 340; an example of a preferred water removal element 340 for exhaust assembly 300 is a plurality of tubular structures, often referred to as "strata tubes".

The description given above provides a fuel cell system 10 having numerous integrated components provided for control of contaminants, sound, and humidity within system 10. Various preferred embodiments of various assemblies have been described for use with the air stream for the cathode side of fuel cell 15. It should be understood that any of the assemblies described above, and variations thereof, could be used on the fuel side (i.e., anode side) of the fuel cell, to protect the catalyst in the fuel cell or the catalyst in a fuel reformer.

The following discussion is directed to discussing various contaminants that are believed to be detrimental to fuel cell operation.

Ambient Air Contaminants

Air contaminants vary with location in both composition and magnitude. Particulate matter, for example, varies nine orders of magnitude in concentration from calm days over the ocean to a windy day in the desert. In addition, the size distribution of the particulates varies depending on the source of the particulate matter. Table 1, below, describes in general terms how the contaminants vary with environmental conditions and location.

Volatile Organic Compounds (VOCs) such as unburned hydrocarbon emissions from internal combustion engines vary greatly in concentration depending on location and the sources of emissions. Urban areas in cold climates experience days with significantly elevated levels of VOCs due to cold started internal combustion engines. Areas where two cycle internal combustion engines are operated have high concentrations of carbon monoxide and VOCs. A city can have relatively low average concentrations of VOCs, but have local areas where the concentrations are elevated. Sulfur compounds in the air are found wherever fuels containing sulfur are combusted, agricultural areas such as hog farms or industrial sources such as pulp mills.

Ammonia is usually present in agricultural regions and close to sewage treatment plants. It has been found that 3-way catalytic converters in automobiles produce about 0.28 ounces of ammonia per 100 miles as a by-product when they reduce oxides of nitrogen in the exhaust stream. The ammonia produced has been found to accumulate in tunnels and other restricted areas.

Salt concentration in the air is present particularly in coastal areas, in deserts, close to industrial discharges and on roadways in cold climates where salt is used for ice removal. Salts such as NaCl, KCl, ammonium sulfates, magnesium sulfate or other sulfates are carried in the air and deliquesce or change state depending on humidity conditions. The salts may be in either solid state as particulate matter, or in water solution. Dry salt particles range in size from 0.5 to 1.5 $\mu$m. Wetted salt particles range in size from 1 to 20 $\mu$m. The salt concentration in the air in coastal regions is greatly dependent on wind velocity, especially if the area is directly exposed to spray. The salt concentration in the air can be as high as 10 PPM at a wind velocity of 35 knots. If the area is moderately protected and not exposed to direct spray, the concentrations will be as displayed in Table 2 for altitudes up to 100 feet.

Typical average concentrations of a few select pollutants in various cities are listed in Table 3. In extreme situations such as in battlefields, warfare gases and other pollutants can be present in the air in concentrations listed in Table 4.

TABLE 1

Types of Contaminants vs. Geographic area

| GEOGRAPHIC AREA | URBAN Major metropolitan areas with heavy industry and motor vehicles | RURAL/ARCTIC Forest, tundra and agriculture | OFF-SHORE AND MARITIME | DESERT | TROPICAL |
|---|---|---|---|---|---|
| ENVIRONMENTAL CONDITIONS | Rain, fog, smog, snow, 28° F. to 100° F. (−1° C. to +40° C.) Corrosive chemicals, VOCs, SO2, gummy soot particles, NOx, NH3, and dried salts. | Snow, freezing rain, frost −40° F. to 90° F. (−40° CC. to +31° C.) Dry, noncorrosive fibrous particles, ammonia, SO2, and blowing dust. | Wet and dry salt, corrosive particles. 0° F. to 90° F. (−18° C. to +31° C.) Blowing rain, salts, sea spray, fog, snow and ice. | Dry, sunny. 30° F. to 120° F. (0° C. to +50° C.) Sandstorms, whirlwinds, dry, corrosive particles, clays and salts. | Heavy rainfall. 40° F. to 120° F. (+5° C. to 50° C.) Fibrous noncorrosive particles, molds and insects. |
| PARTICLE CONCENTRATION ($\mu$g/m$^3$) | 50–175 | <150 | <135 | >350,000 | <135 |
| PARTICLE SIZE RANGE (Micrometers) | 0.01–30 | 0.01–75 | 0.01–10 | 0.01–500 | 0.01–10 |

TABLE 2

Mass concentration of salt vs. wind velocity in moderately protected coastal area Mass Concentration for salt particles

| Wind Velocity (MPH) | (Knots) | <4 micrometer (ppm by mass) | <13 micrometer (ppm by mass) | Total (ppm by mass) |
|---|---|---|---|---|
| 10 | 8.7 | 0.004 | 0.005 | 0.006 |
| 20 | 17.4 | 0.006 | 0.009 | 0.010 |
| 30 | 26.0 | 0.008 | 0.011 | 0.012 |
| 40 | 34.7 | 0.010 | 0.012 | 0.014 |
| 50 | 43.4 | 0.012 | 0.013 | 0.018 |

TABLE 3

Average ambient air contaminants vs. location

| | SO2 (ppb) | PM10 ($\mu$g/m$^3$) | Benzene (ppb) |
|---|---|---|---|
| Perth, Australia | 2.0 | 21 | |
| London, UK | 11.0 | 29 | 1.8 |
| Rome, Italy | 1.0 | 52 | 3.7 |
| Paris, France | 5.0 | | |
| Berlin, Germany | 6.0 | 31 | 2.8 |
| Shanghai, China | 20.0 | | |
| Delhi, India | 9.0 | 162 | |

TABLE 3-continued

Average ambient air contaminants vs. location

|  | SO2 (ppb) | PM10 ($\mu g/m^3$) | Benzene (ppb) |
|---|---|---|---|
| Taipei, Taiwan | 4.0 | 44 |  |
| Moscow, Russia | 41.0 |  |  |
| Cairo, Egypt | 26.0 |  |  |
| Stockholm, Sweden | 2.0 | 25 |  |
| New York, US | 9.0 | 17 | 3.0 |
| Los Angeles, US | 2.0 | 139 | 1.0 |
| Houston, US | 2.6 | 29 | 0.8 |
| Minneapolis, US | 9.8 | 25 | 0.5 |
| Vancouver, Canada | 2.0 | 14 | 0.7 |
| Mexico City, Mexico | 28.0 | 53 |  |
| Sao Paulo, Brazil | 16.0 | 54 |  |

TABLE 4

Concentration of Contaminants in a Battlefield

| Contaminant | Concentration (PPM) |
|---|---|
| Carbon Monoxide | 20 |
| Sulfur Dioxide | 0.5 |
| Benzene | 50 |
| Propane | 90 |
| Nitrogen Dioxide | 0.4 |
| Cyanogan Chloride (CNCL) | 780–1560 |
| Hydrogen Cyanide (HCN) | 1780–3560 |
| Sulfur Mustard | 15 |
| Sarin | 170–340 |

The various contamination control systems described above are preferably designed to reduce the amount of contaminants that would detrimentally effect fuel cell 15.

Contamination Emitted by Compressors

In addition to the contaminants found in atmospheric air, contaminants, either particulate, chemical, or both, may be produced or emitted by the air moving or air handling equipment, such as compressors 50, 50'.

There are at least two types of contaminants emitted by compressors that have been identified to be harmful to fuel cells, lubrication oil that is leaking past bearing seals, and wear particles from rotating components. One of the most common types of compressor used in fuel cell air handling systems is the twin screw Lysholm style compressor. One such compressor has been characterized, and was found to be emitting both particulate matter and small amounts of lubrication oil.

The contaminants from the compressor were collected on two different types of filters downstream of the compressor, one membrane filter to trap particulate matter and one HEPA filter to collect lubrication oil. The compressor was fed clean-room quality HEPA filtered air to eliminate the possibility of collecting contaminant downstream of the compressor that did not originate from the compressor.

Figure 5:
FIG. 5 is a scanning electron microscopic photograph of contaminants collected on a particulate filter positioned downstream of an air compressor.

FIG. 5 is a scanning electron microscope image of contaminant collected on a membrane filter. The symmetrical black shapes on the membrane are 3 $\mu$m etched holes, and the non-uniform shapes are the collected particulate matter. Even though the particles that were analyzed varied in size and shape, they all had the same elemental composition. The particles range in size from 1 to 10 $\mu$m in diameter, which is characteristic for particles of a hard material produced by high-speed abrasion.

Figure 6:
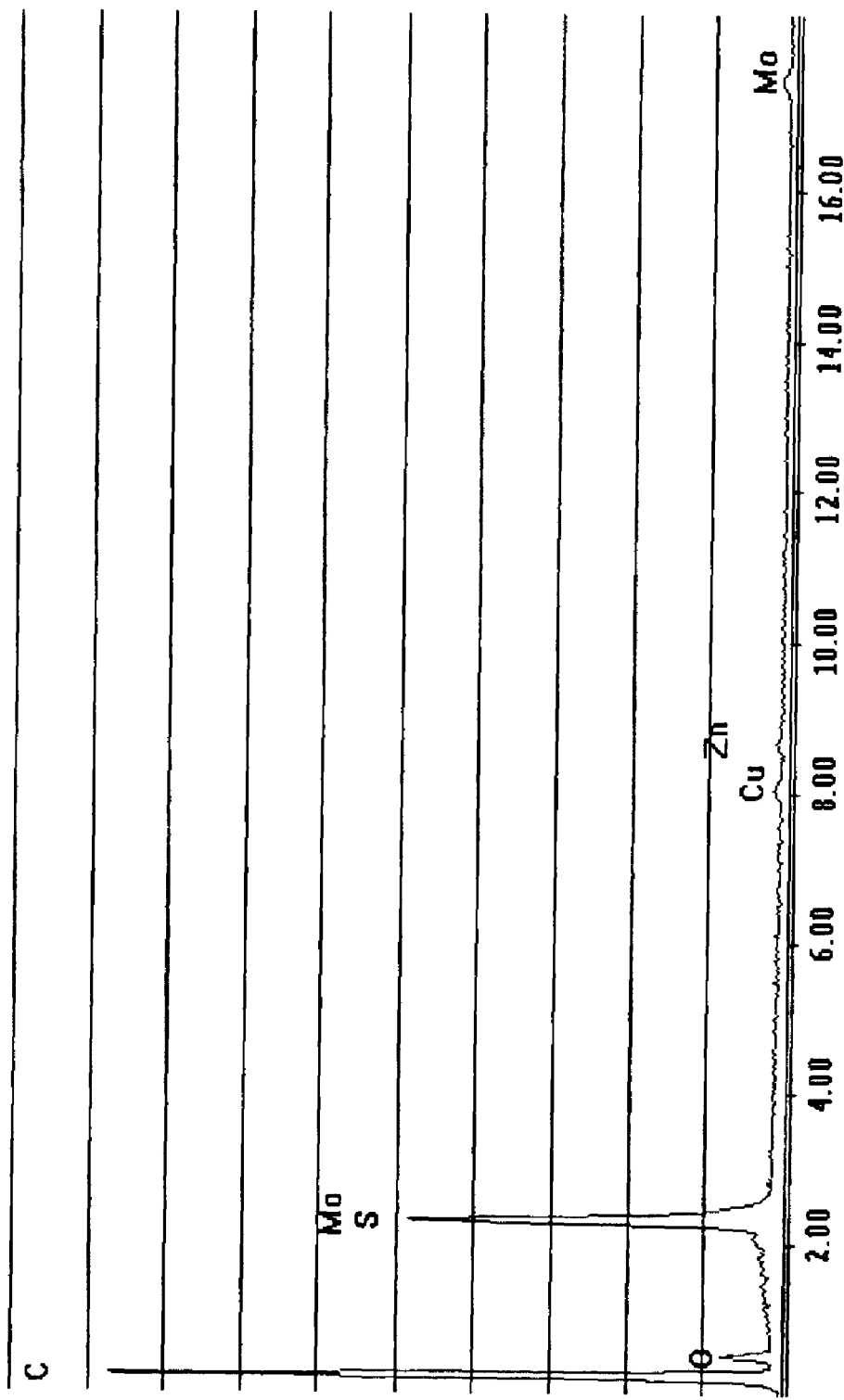
FIG. 6 is a graphical representation of a spectrometer analysis of contaminant collected from the filter of FIG. 5.

An elemental analysis was conducted using an Energy Dispersive Spectrometer (EDS), and the results from a typical particle are shown in FIG. 6. The oxygen and carbon peaks in FIG. 6 indicate organic matter, likely originated from the compressor's lubricating oil. The trace amounts of copper and zinc also suggest lubricating oil, as typical oil-additives contain zinc and copper. The molybdenum and sulfur peaks most likely represents the $MoS_2$ coating used in the lobes in this compressor. All the particles that were analyzed had the same molybdenum to sulfur ratio, but the amount of organic material varied. None of the particles contained aluminum, which is the base material for the compressor housing and lobes. Table 5, below, provides the breakdown of the contaminant elemental analysis.

TABLE 5

Elemental Analysis of Collected Contaminants

| Element | Wt % | At % | K-Ratio | Z | A | F |
|---|---|---|---|---|---|---|
| C K (Carbon) | 82.31 | 92.56 | 0.3289 | 1.0172 | 0.3928 | 1.0001 |
| O K (Oxygen) | 6.14 | 5.18 | 0.0069 | 1.003 | 0.115 | 1.0001 |
| S K (Sulfur) | 2.04 | 0.86 | 0.0193 | 0.9624 | 0.9838 | 1 |
| CuK (Copper) | 0.56 | 0.12 | 0.0049 | 0.8413 | 1.0293 | 1 |
| ZnK (Zinc) | 0.34 | 0.07 | 0.0029 | 0.8426 | 1.0278 | 1 |
| MoK (molybdenum) | 8.62 | 1.21 | 0.0651 | 0.7489 | 1.0091 | 1 |
| Total | 100 | 100 |  |  |  |  |

Effects of Air-contamination on PEM Fuel Cells

In general, the contamination issue for fuel cells is very different than that of traditional power systems such as internal combustion engines and gas turbines. Large particulate matter is filtered out of the combustion process. Sub-micron particulate matter and chemicals are not filtered from the combustion air in engines, as they are harmless. If the same level of filtration is applied to the cathode air in PEM fuel cells, contaminant ions and chemicals may permanently degrade the fuel cell.

Figure 7:
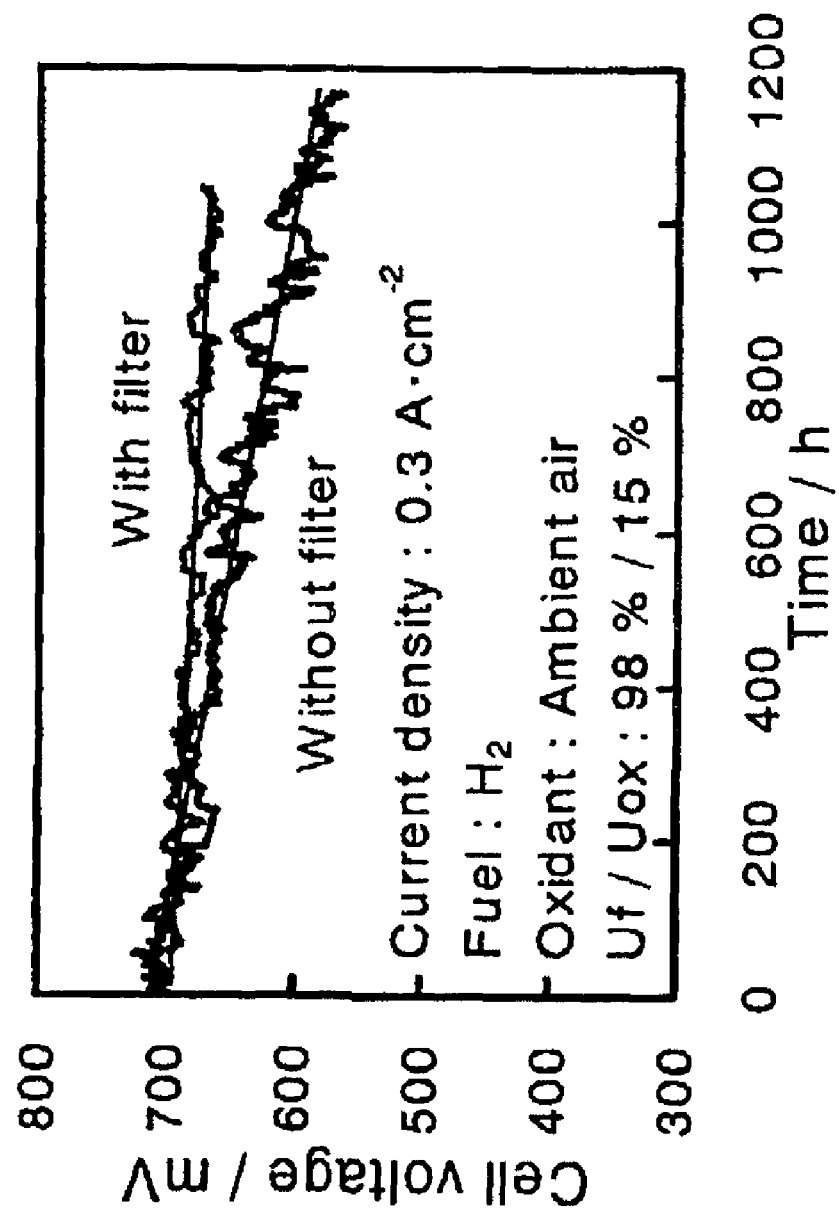
FIG. 7 is a graphical representation showing beneficial effects on fuel cell performance when a particulate filter is included in the air stream.

One study that was conducted on cathode air contamination by Sakamoto et al. clearly indicates the importance of keeping contaminants from entering the cathode. In FIG. 7, a comparison of cell voltage for single cells, with and without particulate filter, is plotted versus time. Sakamoto et al. found that only the cell that was operated without air filtration had an increase in Ca, K, Mg and Na ions at the end of the test.

Figure 8:
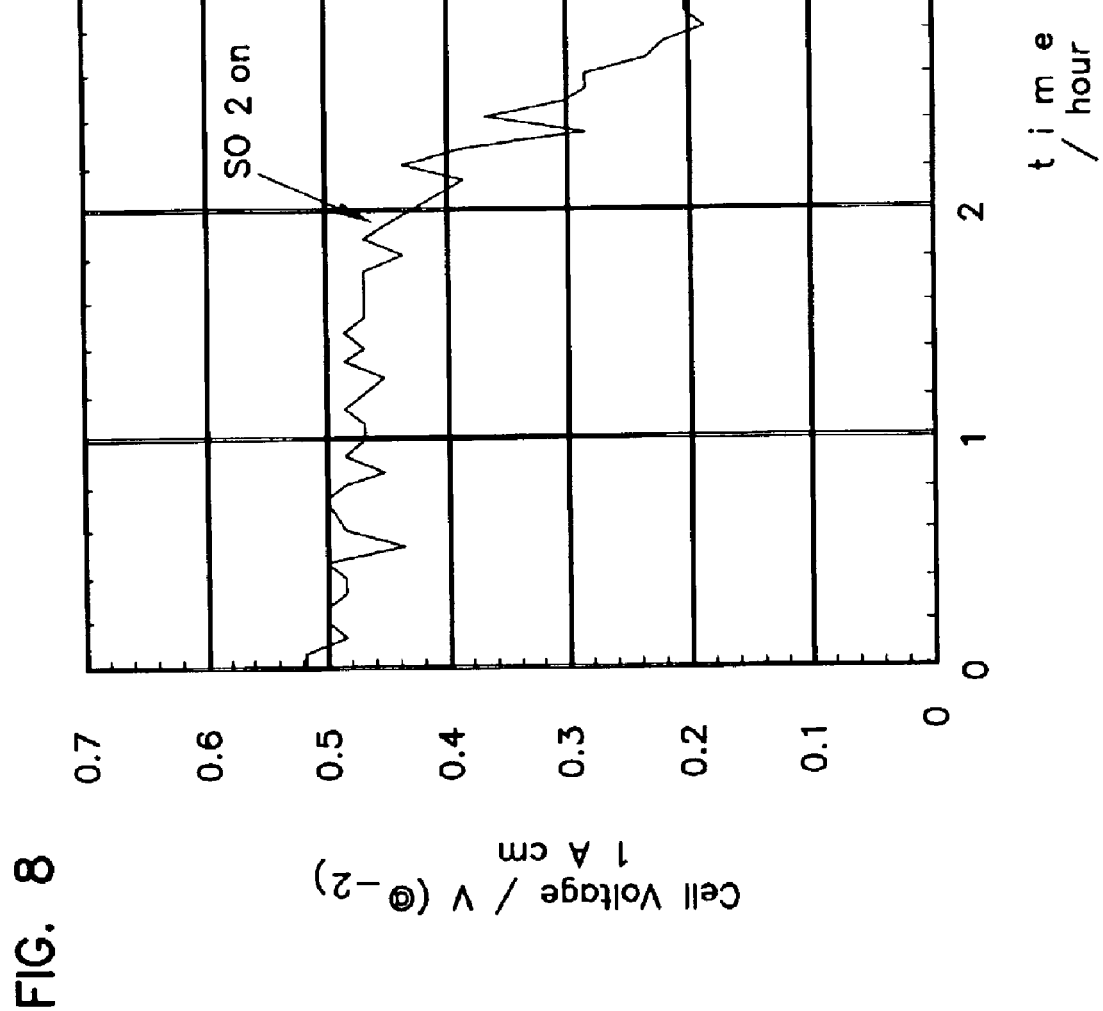
FIG. 8 is a graphical representation of the effect of $SO_2$ on PEM fuel cell performance, under a first set of conditions.
Figure 9:
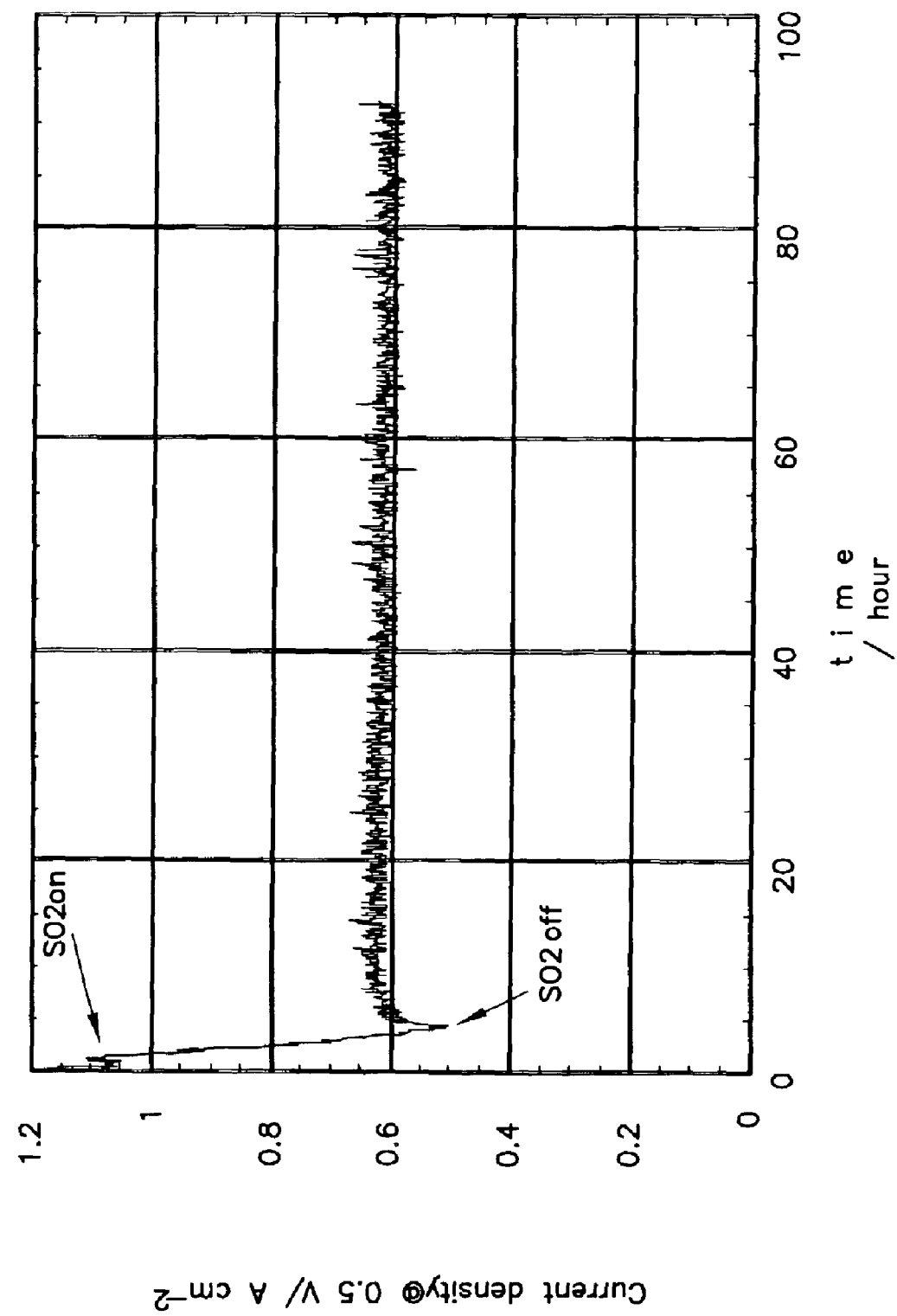
FIG. 9 is a graphical representation of the effect of $SO_2$ on PEM fuel cell performance, under a second set of conditions.
Figure 10:
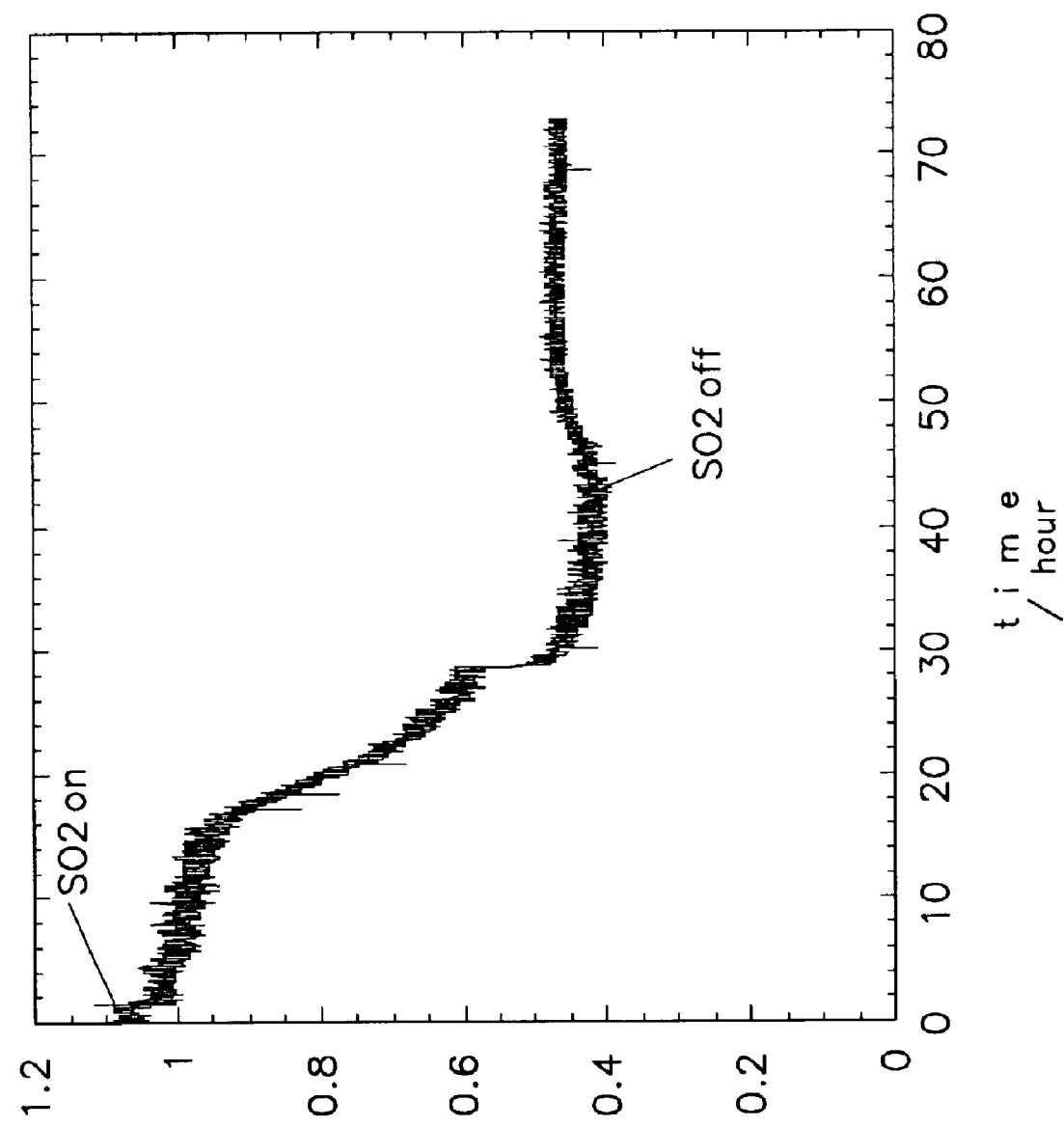
FIG. 10 is a graphical representation of the effect of $SO_2$ on PEM fuel cell performance, under a third set of conditions.

FIGS. 8, 9 and 10 demonstrate the effect of $SO_2$ in the air on the performance of PEM fuel cells is shown. In each of the conducted tests, a hydrogen/air PEM fuel cell, having an anode of 0.17 mg platinum per $cm^2$, and a cathode of 0.18 mg platinum per $cm^2$, was used. The fuel cell was operated at a 50% excess of oxygen, at a temperature of 80° C., and with an air flow rate of 202 standard $cm^3$ per minute. The air fed to the cathode had either a level of 0 $SO_2$ contamination or a level of 5 ppm $SO_2$ contamination.

In the first test, the results of which are graphed in FIG. 8, the fuel cell was operated for two hours with clean air, after which the $SO_2$ contaminated air was started. The fuel cell output drastically dropped during the one hour of exposure to $SO_2$, and did not recover after the contaminated air was replaced with clean air.

In the second test, the results of which are graphed in FIG. 9, the fuel cell was started with $SO_2$ contaminated air for 3.4 hours. The performance began to drop after for 30 minutes and continued to drop the entire 3.4 hours. After the contaminated air was replaced with clean air, the output recovered only slightly, even after operating 87 hours on clean air.

In the third test, the results of which are graphed in FIG. 10, a contamination of only 1 ppm $SO_2$ was present in the dirty air. The fuel cell performance dropped very slowly during the first 15 hours of exposure to $SO_2$ contamination, after which the performance drastically reduced. The exposure to $SO_2$ contamination was 44.5 hours. After 40 hours of exposure, the output stabilized, although about 60% less that the original output. After the contaminated air was replaced with clean air, the output improved slightly and stabilized.

It is clear that $SO_2$ contamination has a dramatic effect on cell performance, and that the reduction in cell performance due to $SO_2$ contamination is largely irreversible. It is important to notice that the $SO_2$ concentration that was used to generate the data shown in FIGS. 8 and 9 was 5 PPM, which is representative of being close to a source of $SO_2$ emissions. For reference, the threshold of odor is between 0.1 and 3 PPM. The time scale for the reduction in cell performance for unprotected fuel cells at typical atmospheric $SO_2$ levels will most likely be much longer than what is indicated in FIGS. 8, 9, and 10, unless the fuel cell is operating close to a $SO_2$ source.

It is to be understood, however, that even though numerous characteristics and advantages of the present disclosure have been set forth in the foregoing description, together with details of the structure and function of the disclosure, such disclosure is illustrative only, and is not intended to be limiting to the scope of the invention in any manner, other than by the appended claims. The invention is not to be limited to the described embodiments, or to use with any particular type of fuel cell, or to the use of specific components, configurations or materials described herein. All alternative modifications and variations of the present invention which fall within the broad scope of the appended claims are covered.

What is claimed is:

1. A fuel cell system comprising:
    (a) a fuel cell having an inlet for an air stream and an outlet;
    (b) air moving equipment having an inlet and an outlet for the air stream, the outlet operably connected to the fuel cell inlet;
    (c) a first integrated assembly positioned in the air stream upstream from the air moving equipment, the first integrated assembly including at least a contamination control system comprising a particulate filter and a chemical filter, and a sound control system;
    (d) a second integrated assembly positioned in the air stream downstream from the air moving equipment and upstream of the fuel cell, the second integrated assembly including at least two systems of a contamination control system comprising a particulate filter, a sound control system, a temperature control system, and a water management system; and
    (e) an exhaust integrated assembly positioned in the air stream downstream of the fuel cell, the exhaust integrated assembly including at least two of a contamination control system, a sound control system, a temperature control system, and a water management system.

2. The fuel cell system according to claim 1, wherein the first integrated assembly includes a sound control system.

3. The fuel cell system according to claim 2, wherein the sound control system comprises a sonic choke.

4. The fuel cell system according claim 1, wherein the second integrated assembly comprises a contamination control system and a water management control system.

5. The fuel cell system according to claim 4, wherein the contamination control system comprises a particulate filter and a chemical filter.

6. The fuel cell system according to claim 5, wherein the particulate filter and the chemical filter comprise PTFE.

7. The fuel cell system according to claim 4, wherein the second integrated assembly further comprises a sound control system.

8. The fuel cell system according to claim 1, further comprising:
    (a) a second air moving equipment; and
    (b) a third integrated assembly, wherein:
        (i) the third integrated assembly is positioned downstream from the air moving equipment and upstream from the second air moving equipment; and
        (ii) the second integrated assembly is positioned downstream from the second air moving equipment.

9. The fuel cell system according to claim 8, wherein the third integrated assembly comprises a sound control system and a temperature control system.

10. The fuel cell system according to claim 9, wherein the third integrated assembly further comprises a contamination control system.

11. The fuel cell system according to claim 1, wherein the exhaust integrated assembly comprises a sound control system and a water management system.

12. The fuel cell system according to claim 11, wherein the exhaust integrated assembly further comprises a contamination control system comprising a chemical filter.

13. An integrated assembly for use with a fuel cell system comprising sound-producing air moving equipment, the assembly comprising:
    (a) a housing having an air inlet and an air outlet;
    (b) a sound control system constructed reduce sound by at least 3 dB; and
    (c) a heat exchanger, each of the sound control system and the heat exchanger within the housing.

14. The integrated assembly according to claim 13, wherein the heat exchanger is water cooled.

15. The integrated assembly according to claim 13, wherein the sound control system comprises a first attenuator and a second attenuator.

* * * * *